United States Patent
Guarda et al.

(10) Patent No.: US 9,568,250 B2
(45) Date of Patent: Feb. 14, 2017

(54) METHOD FOR TRANSFERRING HEAT

(75) Inventors: Pier Antonio Guarda, Arese (IT);
Gianfranco Spataro, Lissone (IT);
Vincent Pierre Meunier, Arese (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 13/820,781

(22) PCT Filed: Sep. 8, 2011

(86) PCT No.: PCT/EP2011/065517
§ 371 (c)(1),
(2), (4) Date: Mar. 5, 2013

(87) PCT Pub. No.: WO2012/032106
PCT Pub. Date: Mar. 15, 2012

(65) Prior Publication Data
US 2013/0168049 A1  Jul. 4, 2013

(30) Foreign Application Priority Data
Sep. 10, 2010 (EP) .................................... 10176092

(51) Int. Cl.
*F28D 15/00* (2006.01)
*C09K 5/10* (2006.01)

(52) U.S. Cl.
CPC ................. *F28D 15/00* (2013.01); *C09K 5/10* (2013.01)

(58) Field of Classification Search
None
See application file for complete search history.

(56) References Cited

U.S. PATENT DOCUMENTS

| | | | |
|---|---|---|---|
| 4,955,726 A | 9/1990 | Bargigia et al. | |
| 6,148,634 A | 11/2000 | Sherwood | |
| 6,303,080 B1 | 10/2001 | Tuma | |
| 6,610,250 B1 | 8/2003 | Tuma | |
| 2002/0023447 A1 | 2/2002 | Podtchereniaev et al. | |
| 2003/0127623 A1* | 7/2003 | Maccone et al. ............... | 252/70 |
| 2005/0126756 A1 | 6/2005 | Costello et al. | |
| 2007/0051916 A1 | 3/2007 | Flynn et al. | |

FOREIGN PATENT DOCUMENTS

| | | |
|---|---|---|
| EP | 0193028 A1 | 9/1986 |
| EP | 0856038 B1 | 2/2001 |
| GB | 1226566 A | 3/1971 |
| WO | WO 9714762 A1 | 4/1997 |
| WO | WO 2007099055 A2 | 9/2007 |
| WO | WO 2008122639 A1 | 10/2008 |
| WO | WO 2010034698 * | 4/2010 |
| WO | WO 2010034698 A1 | 4/2010 |

OTHER PUBLICATIONS

Solvay Solexis (brochure)—"Fluorinated Fluids and Lubricants for the Solar Industry. Galden® PFPE", 2010, retrieved from the Internet at URL:http://www.solvaysites.com/sites/solvayplastics/EN/Solvay%20Plastics%20Literature/Leaflet_Fluoropolymers_Fluorinated_Fluids_and_Lubricants_for_the_Solar_Industry_EN.pdf retrieved on Feb. 9, 2011 Golden PFPE; XP002622054; 2 pgs.

Solvay Solexis (brochure)—"Galden®, Heat Transfer Fluids", 2007, retrieved from the Internet at: URL:http://www.solvaysites.com/sites/solvayplastics/EN/Solvay%20Plastics%20Literature/BR_Galden_HT_EN.pdf, retrieved on Feb. 9, 2011; XP002622053; 4 pgs.

* cited by examiner

Primary Examiner — Necholus Ogden, Jr.

(57) ABSTRACT

A process for transferring heat comprising the following steps:
(1) transferring heat from a body to a first heat transfer system by means of a secondary loop passageway comprising a heat transfer fluid and, optionally,
(2) transferring heat from a second heat transfer system to said body by means of said secondary loop passageway comprising said heat transfer fluid,
wherein: said second heat transfer system being the same as or different from said first heat transfer system, said secondary loop passageway comprises at least one polymer sealant selected from a rubber seal and a plastic pipe; and said heat transfer fluid comprises one or more linear perfluoropolyethers having formula $R_F-(OCF_2)_n(OCF_2CF_2)_m(OCF_2(CF_2)_zCF_2)_p-OR_F$ (I), wherein $R_F$, equal or different at each occurrence, is a $C_1$-$C_3$ perfluoroalkyl group, m, n and p, equal to or different from each other, are integers comprised between 0 and 100, the sum m+n being higher than 0, and z is equal to 1 or 2, and wherein said heat transfer fluid is circulated through said secondary loop passageway in step (1) for transferring said heat from said body to said first heat transfer system and, optionally, in step (2) for transferring said heat from said second heat transfer system to said body.

18 Claims, No Drawings

METHOD FOR TRANSFERRING HEAT

CROSS-REFERENCE TO RELATED APPLICATIONS

This application is a U.S. national stage entry under 35 U.S.C. 371 of International Application No. PCT/EP2011/065517 filed Sep. 8, 2011, which claims priority to European application No. 10176092.4 filed on Sep. 10, 2010, the whole content of this application being incorporated herein by reference for all purposes.

This application claims priority to European application No. 10176092.4 filed on 10 Sep. 2010, the whole content of this application being incorporated herein by reference for all purposes.

TECHNICAL FIELD

The present invention relates to use of perfluoropolyether fluids as heat transfer media in secondary loop heat transfer systems.

BACKGROUND ART

Fluorinated ether fluids are known in the art to be suitable for use as heat transfer media due to their high chemical and thermal stability, non toxicity and non flammability to be particularly suited for heat transfer applications where such properties, in particular the non flammability, are extremely important for complying with outstanding safety standards. Representative examples of such applications notably include cooling circuits on board of aircrafts, refrigeration systems for supermarkets or heat transfer circuits in industrial plants.

In particular, hydrofluoro(poly)ethers are known in the art to be advantageously used as heat transfer media in low-temperature applications, in particular for transferring heat from a heat source to a heat sink, in view of their low viscosities at low temperatures. However, the main drawback is that hydrofluoro(poly)ether fluids typically require pressurized heat transfer systems to be maintained in a liquid phase over the required operating temperatures.

Among major issues affecting use of fluorinated ether fluids as heat transfer media in heat transfer systems mention can be made of Global Warming caused by emissions of fluids to the atmosphere with particular reference to secondary loop heat transfer systems usually equipped with polymer sealants, suitable for vehicling and circulating the heat transfer fluid from one body to another, which are commonly prone to leakage, in particular in pressurized systems.

Also, as is well known in the art, secondary loop devices are typically affected by moisture, usually vehicled by heat transfer fluids, which condenses and freezes thereon to form frost. This frost greatly decreases the cooling efficiency of the heat transfer system and, if left to accumulate, can even block the flow of the heat transfer fluid circulated through the device to diminish the overall heat transfer capacity of the system.

Thus, EP 0856038 A (MINNESOTA MINING AND MANUFACTURING COMPANY) 5 Aug. 1998 discloses use of hydrofluoroethers as heat transfer fluids for secondary loop refrigeration systems typically operating at temperatures below −15° C.

Also, U.S. Pat. No. 6,148,634 (3M INNOVATIVE PROPERTIES COMPANY) 21 Nov. 2000 discloses use in a multistage refrigeration system of secondary refrigerants notably including perfluoropolyethers commercially available as KRYTOX® K oils and GALDEN® HT fluids.

Moreover, WO 2010/034698 (SOLVAY SOLEXIS S.P.A.) 1 Apr. 2010 discloses use of compositions comprising fluorinated fluids free from functional groups and certain functional (per)fluoropolyether fluids as heat transfer media for transferring heat from a heat source to a heat sink. However, no mention is made therein about compatibility of said heat transfer media towards polymer sealants typically present in secondary loop heat transfer systems.

Further, U.S. Pat. No. 4,955,726 (MONTEDISON S.P.A.) 11 Sep. 1990 discloses use of perfluoropolyethers as heat transfer testing fluids in the electronic industry, in particular for thermal shock test, gross leak test and burn in test applications, at temperatures as low as −65° C. and/or as high as 200° C., depending on the test application. However, these applications require directly contacting the electronic component with the heat transfer fluid by dipping it into the fluid.

There is thus still a need in the art for fluorinated ether heat transfer fluids suitable for use in secondary loop heat transfer systems, said fluids being advantageously endowed with:

viscosities as low as compared with viscosities of hydrofluoro(poly)ether fluids in a wide operating temperature range of from −120° C. up to 180° C., boiling points up to 250° C. at atmospheric pressure, low permeability and high chemical compatibility and resistance towards polymer sealants, in particular at high temperatures, inherent chemical inertness and stability, and low solubility of water therein to be successfully used in said secondary loop heat transfer systems so as to comply with outstanding safety standards by successfully reducing or even eliminating risks of leaks through polymer sealants and thus corresponding emissions of said fluids to the atmosphere, while increasing efficiency of the systems and minimizing maintenance thereof.

SUMMARY OF INVENTION

It is thus an object of the invention a process for transferring heat, said process comprising the following steps:

(1) transferring heat from a body to a first heat transfer system by means of a secondary loop passageway comprising a heat transfer fluid and, optionally, (2) transferring heat from a second heat transfer system, said second heat transfer system being the same as or different from said first heat transfer system, to said body by means of said secondary loop passageway comprising said heat transfer fluid, wherein:

said secondary loop passageway comprises at least one polymer sealant selected from a rubber seal and a plastic pipe; and said heat transfer fluid comprises one or more linear perfluoropolyethers having formula (I) here below:

$$R_F-(OCF_2)_n(OCF_2CF_2)_m(OCF_2(CF_2)_zCF_2)_p-OR_F \qquad (I),$$

wherein $R_F$, equal or different at each occurrence, is a $C_1$-$C_3$ perfluoroalkyl group, m, n and p, equal to or different from each other, are integers comprised between 0 and 100, preferably between 0 and 50, the sum m+n being higher than 0, and z is equal to 1 or 2, and wherein said heat transfer fluid is circulated through said secondary loop passageway in step (1) for transferring said heat from said body to said first heat transfer system and, optionally, in step (2) for transferring said heat from said second heat transfer system to said body.

It has been surprisingly found that by means of the process of the present invention leaks through rubber seals and plastic pipes are successfully reduced due to low permeability and high chemical compatibility and resistance of the heat transfer fluid towards polymer sealants, thus advantageously increasing efficiency of the secondary loop heat transfer system while complying with outstanding safety standards and also minimizing maintenance thereof by advantageously decreasing routine defrosting work and routine replacement of polymer sealants.

By the term "body" it is hereby intended to denote notably an enclosed space or an object.

Non-limitative examples of bodies typically involved in the process of the invention notably include compartments, devices, reactors, chambers, vials.

The heat transfer system of step (1) of the process of the invention is hereby intended to denote a system which is maintained at a temperature lower than the temperature of the body. The heat transfer system of step (2) of the process of the invention is hereby intended to denote a system which is maintained at a temperature higher than the temperature of the body.

Non-limitative examples of heat transfer systems suitable for use in step (1) of the process of the invention notably include fluids, e.g. air and liquid nitrogen, and refrigeration systems, e.g. chillers.

Non-limitative examples of heat transfer systems suitable for use both in step (1) and in step (2) of the process of the invention notably include thermocryostats.

By means of the process of the present invention the temperature of the body is advantageously set at temperatures typically up to 250° C., preferably up to 150° C.

The temperature of the body of the process of the invention may be successfully set at temperatures typically of less than −15° C., preferably of less than −25° C., more preferably of less than −50° C.

In a first embodiment of the process of the invention, the process of the invention is particularly adapted for operating secondary loop heat transfer systems wherein step (2) as defined above is absent.

The process of this first embodiment of the invention is advantageously suited for cooling compartments, e.g. food stuff compartments in supermarkets or in transport trolleys on board of aircrafts, vehicles or boats, devices and reactors, especially in the cryogenic surgery or in the nuclear and energy industry, e.g. lithium ion batteries and fuel cells, or for storing fuels, in particular liquid hydrogen.

In a second embodiment of the process of the invention, the process of the invention is particularly adapted for operating secondary loop heat transfer systems wherein step (2) as defined above is present.

In a first variant of the second embodiment of the process of the invention, the second heat transfer system suitable for use in step (2) as defined above is the same as the first heat transfer system suitable for use in step (1) as defined above.

In a second variant of the second embodiment of the process of the invention, the second heat transfer system suitable for use in step (2) as defined above is different from the first heat transfer system suitable for use in step (1) as defined above.

The process of this second embodiment of the invention is advantageously suited for operating devices and reactors, especially for operating freeze drying devices by:

freezing the product contained in a vacuum chamber, said vacuum chamber comprising one or more passageways comprising the heat transfer fluid of the invention which is used to transfer heat from the vacuum chamber to a heat transfer system, said vacuum chamber being maintained at a temperature of less than −50° C., preferably of less than −80° C.;

dehydrating the product under vacuum while the vacuum chamber is heated up to room temperature;

sterilizing the vacuum chamber after removal of the freeze dried product by a high pressure saturated steam at temperatures ranging from 120° C. to 135° C.

It has been found that the heat transfer fluid of the process of the invention advantageously enables operating the secondary loop heat transfer process of the invention in a wide range of temperatures, typically of from −120° C. up to 180° C., preferably of from −100° C. up to 150° C., more preferably of from −70° C. up to 125° C., while exhibiting low viscosities at low temperatures and high boiling points, thus avoiding excessive increase of pressure in the heat transfer systems, in particular in sealed systems, wherein leaks through polymer sealants are drastically reduced.

The heat transfer fluid of the process of the invention can also comprise, in addition to one or more linear perfluoropolyethers having formula (I) as described above, one or more other fluids selected from the group consisting of perfluorocarbons (PFCs), hydrofluorocarbons (HFCs), hydrofluoroethers (HFEs), hydrofluoropolyethers (HFPEs) and perfluoropolyethers (PFPEs).

Non-limitative examples of suitable perfluorocarbons (PFCs) notably include perfluoro(cyclo)alkanes, perfluoroalkylamines and perfluoroalkylethers commercially available from 3M as FLUORINERT® fluids, in particular FLUORINERT® FC-40, FC-43, FC-70, FC-71, FC-72, FC-75, FC-77, FC-80, FC-84, FC-104, FC-3283, FC-5311 and those commercially available from F2 Chemicals Ltd. as FLUTEC® fluids, in particular FLUTEC® PP-1, PP-2, PP-3, PP-5, PP-9.

Non-limitative examples of suitable hydrofluorocarbons (HFCs) notably include those commercially available from Nippon Zeon Co., Ltd. as ZEORORA® fluids, from E. I. Du Pont de Nemours and Co. as VERTREL® fluids and from Solvay Fluor GmbH as SOLKANE® 365 MFC fluid.

Non-limitative examples of suitable hydrofluoroethers (HFEs) notably include those complying with either of formulae (II-A) or (II-B) here below:

  (II-A) or

  (II-B)

wherein:

$R_a$ and $R_a'$, equal to or different from each other, are independently selected from $-C_mF_{2m+1}$, $-C_nF_{2n+1-h}H_h$, $-C_zF_{2z}OC_yF_{2y+1}$, $-C_uF_{2u-u'}H_{u'}OC_wF_{2w+1-w'}H_{w'}$ and $-C_uF_{2u-u'}H_{u'}OC_yF_{2y+1}$ groups, with m, u, w, y, z being integers from 1 to 8, preferably from 1 to 7, h, u' and w' being integers 1 such that h≤2n+1, u'≤2u, w'≤2w+1, with the proviso that at least one of $R_a$ and $R_a'$ in formula (II A) is a $-C_nF_{2n+1-h}H_h$ group or a $-C_uF_{2u-u'}H_{u'}OC_wF_{2w+1-w'}H_{w'}$ group as defined above;

J is a divalent hydrocarbon radical having 1 to 12 carbon atoms, linear or branched, aliphatic or aromatic, preferably an aliphatic divalent hydrocarbon group having 1 to 6 carbon atoms, e.g. $-CH_2-$, $-CH_2CH_2-$ or $-CH(CH_3)-$;

j is equal to 0 or 1.

Representative fluids HFEs having formula (II-A) as described above useful in the process of the present invention include, but are not limited to, the following compounds and mixtures thereof: $C_3F_7OCH_3$, $C_4F_9OCH_3$, $C_4F_9OC_2H_5$, $C_7F_{15}OC_2H_5$.

Representative fluids HFEs having formula (II-B) as described above useful in the process of the present invention include, but are not limited to, those disclosed in US 2007051916 (3M INNOVATIVE PROPERTIES COMPANY) 8 Mar. 2007 or in US 2005126756 (3M INNOVATIVE PROPERTIES COMPANY) 16 Jun. 2005.

Non-limitative examples of suitable fluids HFEs having formula (II-B) as described above notably include the following compounds and mixtures thereof:
$CF_3CFHCF_2CH(CH_3)OCF_2CFHCF_3$, $CF_3CFHCF_2CH_2OCF_2CFHCF_3$, $CF_3CF(CH_2OCF_2CFHCF_3)CFHCF(CF_3)_2$, $CF_3CFHCF(CH_2OCF_2CFHCF_3)CF(CF_3)_2$, $CF_3CF[CH(CH_3)OCF_2CFHCF_3]CFHCF(CF_3)_2$, $CF_3CF[CH(CH_3)OCF_2CFHCF_3]CFHCF_2CF_3$, $CF_3CF_2CF[CH(CH_3)OCF_2CFHCF_3]CFHCF_3$, $CF_3CFHCF_2C(CH_3)_2OCF_2CFHCF_3$, $CF_3CFHCF_2CH_2OCF_2CFHOC_4F_9$, $CF_3CFHCF_2CH(OCF_2CFHCF_3)CH_2OCF_2CFHCF_3$, $CF_3CFHCF_2CH_2OCF_2CFHOC_3F_7$, $CF_3CFHCF_2CH_2OCF_2CFHOCF_3$, $CF_3CF_2CF_2OCH_2CH_2CH_2OCF_2CF_2CF_3$, $CF_3CF_2CF_2CF_2OCH_2CH_2CH_2OCF_2CF_2CF_2CF_3$, $CF_3CF_2CF_2OCH_2CH_2OCF_2CF_2CF_3$, $CF_3CF_2CF_2CF_2CF_2OCH_2CH_2CH_2OCF_2CF_2CF_2CF_2CF_3$, $CF_3CF_2CF[CF(CF_3)_2]OCH_2CH_2CH_2OCF[CF(CF_3)_2]CF_2CF_3$.

Non-limitative examples of suitable hydrofluoropolyethers (HFPEs) notably include those complying with formula (III) here below:

$$R_bO\!-\!R_f\!-\!R_b' \qquad (III),$$

wherein:

$R_b$ and $R_b'$, equal to or different from each other, are independently selected from $-C_mF_{2m+1}$ and $-C_nF_{2n+1-h}H_h$ groups, with m, n being integers from 1 to 3, h being integer≥1 such that h≤2n+1, with the proviso that at least one of $R_b$ and $R_b'$ is a $-C_nF_{2n+1-h}H_h$ group as defined above;

$R_f$ is a perfluoropolyoxyalkylene chain selected from the followings:

(1) $-(CF_2O)_{a1}-(CF_2CF_2O)_{b1}-(CF_2-(CF_2)_{z'}-CF_2O)_{c1}-$, with a1, b1 and c1 being integers up to 100, preferably up to 50, and z' being an integer equal to 1 or 2, a1≥0, b1≥0, c1≥0 and a1+b1>0; preferably, each of a1 and b1 being >0 and b1/a1 being comprised between 0.1 and 10;

(2) $-(C_3F_6O)_{a2}-(C_2F_4O)_{b2}-(CFXO)_{c2}-$, with X being, at each occurrence, independently selected from $-F$ and $-CF_3$; a2, b2 and c2 being integers up to 100, preferably up to 50, a2>0, b2≥0, c2≥0; preferably, b2 and c2>0, a2/b2 being comprised between 0.2 and 5.0 and (a2+b2)/c2 being comprised between 5 and 50;

(3) $-(C_3F_6O)_{a3}-(CFXO)_{b3}-$, with X being, at each occurrence, independently selected from $-F$ and $-CF_3$; a3 and b3 being integers up to 100, preferably up to 50, a3>0, b3≥0, preferably b3>0, a3/b3 being comprised between 5 and 50.

Non-limitative examples of fluids HFPEs having formula (III) as described above notably include those complying with formulae here below: $HCF_2O(CF_2CF_2O)CF_2H$; $HCF_2O(CF_2CF_2O)_2CF_2H$; $HCF_2O(CF_2CF_2O)_2(CF_2O)_2CF_2H$; $HCF_2O(CF_2CF_2O)_3CF_2H$; $HCF_2O(CF_2CF_2O)_3(CF_2O)_2CF_2H$; $HCF_2O(CF_2CF_2O)_4CF_2H$; $HCF_2O(CF_2CF_2O)_3CF_2OCF_2H$; $HCF_2O(CF_2CF_2O)_4CF_2OCF_2H$; $CF_3O(CF_2CF_2O)_2CF_2H$; $CF_3O(CF_2CF_2O)_2(CF_2O)CF_2H$; $CF_3O(CF_2CF_2O)(CF_2O)_2CF_2H$; $CF_3O(CF_2CF_2O)_2(CF_2O)_2CF_2H$; $CF_3O(CF_2CF(CF_3)O)_2CF_2H$; $CF_3O(CF_2CF(CF_3)O)_3CF_2H$; $CF_3O(C_3F_6O)_2(CF(CF_3)O)CF_2H$; $HCF_2CF_2O(CF_2CF_2O)CF_2CF_2H$; $HCF_2CF_2OCF_2C(CF_3)_2CF_2OCF_2CF_2H$; $CH_3OCF_2CF_2OCH_3$; $CH_3O(CF_2CF_2O)_2CH_3$; $CH_3O(CF_2CF_2O)(CF_2O)(CF_2CF_2O)CH_3$; $CH_3O(CF_2CF_2O)_3CH_3$; $CH_3O(CF_2CF_2O)(CF_2O)_2(CF_2CF_2O)CH_3$; $C_2H_5OCF_2CF_2OC_2H_5$; $C_2H_5O(CF_2CF_2O)_2C_2H_5$; $CH_3OCF_2H$; $CH_3OCF_2CF_2OCF_2H$; $CH_3OCF_2CF_2OCF_2OCF_2H$; $C_2H_5OCF_2H$; $C_2H_5OCF_2CF_2OCF_2H$; $C_2H_5O(CF_2CF_2O)_2CF_2H$.

Preferred fluids HFPEs having formula (III) as described above suitable for use in the process of the present invention are those wherein $R_f$ is a perfluoropolyoxyalkylene chain having structure (1) or (2) as described above.

Most preferred fluids HFPEs having formula (III) as described above suitable for use in the process of the present invention are those wherein $R_f$ is a perfluoropolyoxyalkylene chain having structure (1) as described above and one of $R_b$ and $R_b'$ is a $-C_nF_{2n+1-h}H_h$ group as defined above, the remaining group being a $-C_mF_{2m+1}$ group as defined above.

Non-limitative examples of suitable perfluoropolyethers (PFPEs) notably include those having formula (IV) here below:

$$R_cO\!-\!R_f'\!-\!R_c' \qquad (IV)$$

wherein:

$R_c$ and $R_c'$, equal to or different from each other, are independently selected from $-C_mF_{2m+1}$ groups, with m being integers from 1 to 3;

$R_f'$ is a perfluoropolyoxyalkylene chain selected from the followings:

(1') $-(C_3F_6O)_{a1'}-(C_2F_4O)_{b1'}-(CFXO)_{c1'}-$, with X being, at each occurrence, independently selected from $-F$ and $-CF_3$; a1', b1' and c1' being integers up to 100, preferably up to 50, a1'>0, b1'≥0, c1'≥0; preferably, b1' and c1'>0, a1'/b1' being comprised between 0.2 and 5.0 and (a1+b1')/c1' being comprised between 5 and 50;

(2') $-(C_3F_6O)_{a2'}-(CFXO)_{b2'}-$, with X being, at each occurrence, independently selected from $-F$ and $-CF_3$; a2' and b2' being integers up to 100, preferably up to 50, a2'>0, b2'≥0, a2'/b2' being comprised between 5 and 50.

Preferred fluids PFPEs having formula (IV) as described above suitable for use in the process of the present invention are those wherein $R_f'$ is a perfluoropolyoxyalkylene chain having structure (2') as described above.

Non-limitative examples of fluids PFPEs having formula (IV) as described above notably include those commercially available from Solvay Solexis S.p.A. under the trademark names GALDEN®.

The heat transfer fluid of the process of the invention can also further comprise one or more additives.

Non-limitative examples of suitable additives notably include anti-wear additives, oxidation inhibitors and anti-rust additives.

Representative examples of additives which can be advantageously added to the heat transfer fluid of the process of the invention notably include functional PFPEs commercially available from Solvay Solexis S.p.A. under the trademark names FOMBLIN® DA 305, FOMBLIN® DA 306, FOMBLIN® DA 308 and functional PFPEs having end-groups selected from pyridine, amine, aryl classes described in WO 2007/099055 (SOLVAY SOLEXIS S.P.A.) 7 Sep. 2007.

The heat transfer fluid of the process of the invention preferably comprises:
- at least 50% by moles, more preferably at least 60% by moles, even more preferably at least 70% by moles of one or more linear perfluoropolyethers having formula (I) as described above,
- optionally, one or more fluids selected from hydrofluoroethers (HFEs), hydrofluoropolyethers (HFPEs) and perfluoropolyethers (PFPEs) as defined above, and
- optionally, one or more additives as defined above.

The heat transfer fluid of the process of the invention more preferably comprises:
- at least 50% by moles, more preferably at least 60% by moles, even more preferably at least 70% by moles of one or more linear perfluoropolyethers having formula (I) as described above, and
- optionally, at most 40% by moles, more preferably at most 30% by moles, even more preferably at most 20% by moles of one or more hydrofluoropolyether fluids (HFPEs) having formula (III) as described above wherein $R_f$ is a perfluoropolyoxyalkylene chain having structure (1) as described above and one of $R_b$ and $R_b'$ is a $-C_nF_{2n+1-h}H_h$ group as defined above, the remaining group being a $-C_mF_{2m+1}$ group as defined above.

The heat transfer fluid of the process of the invention even more preferably consists of one or more linear perfluoropolyethers having formula (I) as described above.

Very good results have been obtained by using in the process of the invention a heat transfer fluid consisting of one or more linear perfluoropolyethers having formula (I) as described above.

The linear perfluoropolyether having formula (I) as described above preferably complies with formula (I-bis) here below:

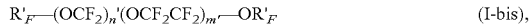

$$R'_F-(OCF_2)_{n'}(OCF_2CF_2)_{m'}-OR'_F \quad \text{(I-bis)},$$

wherein $R'_F$, equal or different at each occurrence, is a $C_1$-$C_3$ perfluoroalkyl group, m' and n' are integers higher than 0 and up to 50, preferably up to 20, m'/n' being comprised between 0.1 and 10.

The linear perfluoropolyethers having formula (I) as described above have advantageously a viscosity of at most 20 cSt, preferably of at most 10 cSt, more preferably of at most 5 cSt as measured according to ASTM D445 at 20° C.

The linear perfluoropolyethers having either of formulae (I) or (I-bis) as described above may be prepared according to procedures as described in WO 2008/122639 (SOLVAY SOLEXIS S.P.A.) 16 Oct. 2008 followed by photochemical fluorination according to the procedure as described in EP 0193028 A (MONTEDISON S.P.A.) 3 Sep. 1986.

Depending on the distilling fraction recovered, linear perfluoropolyethers having either of formulae (I) or (I-bis) as described above will be obtained having boiling points suitable for use in specific secondary loop heat transfer systems operating in a well-defined temperature range.

Non-limitative examples of heat transfer fluids suitable for use in the process of the invention notably include heat transfer fluids comprising one or more linear perfluoropolyethers having formula (I) as described above having boiling points typically ranging between 80° C. and 250° C., preferably between 100° C. and 200° C., more preferably between 110° C. and 180° C.

Non-limitative examples of suitable rubber seals notably include O-rings, hoses, diaphragms, gaskets, blankets.

Preferred rubber seals suitable for use in secondary loop passageways for use in the process of the invention notably include those made up of ethylene propylene (so-called EPDM), silicone, fluorosilicone, nitrile, butyl, fluorocarbon, cis-polyisoprene, polyurethane, polyacrylate, chloroprene, polysulfide, styrene butadiene rubbers.

Most preferred rubbers seals suitable for use in secondary loop passageways for use in the process of the invention are those made up of EPDM, silicone and fluorosilicone rubbers.

Preferred plastic pipes suitable for use in secondary loop passageways for use in the process of the invention notably include those made up of polyvinylidene fluoride, polyethylene, polypropylene, polyvinylchloride, polycarbonate, polyetheretherketone, acrylic, epoxy, polysulfone, phenolic, polyamide, acrylonitrile butadiene styrene.

Non-limitative examples of secondary loop passageways suitable for use in the process of the invention preferably comprise at least one rubber seal as defined above.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Linear perfluoropolyether having formula $CF_3O(CF_2O)_n(CF_2CF_2O)_m-CF_3$ (I-A), wherein the average m/n ratio is 1.7, having a number average molecular weight of 560. The physical properties are set forth in Table 1 here below.

NOVEC® 7500 hydrofluoroether commercially available from 3M. The physical properties are set forth in Table 1 here below.

TABLE 1

| | (I-A) | NOVEC ® 7500 hydrofluoroether |
|---|---|---|
| Boiling point [° C., atmospheric pressure] | 125° C. | 128° C. |
| Density [g/ml, 20° C.] | 1.70 | 1.61 |
| Viscosity [cSt, 20° C., ASTM D445] | 0.84 | 0.77 |
| Viscosity [cSt, −60° C., ASTM D445] | 7.9 | 9.1 |
| Water content [ppmw, Karl Fisher] | 15 | 45 |

Permeability Tests

Permeation properties were measured according to ASTM D814-95 standard procedures by contacting a fluid with EPDM, silicone and fluorosilicone rubber sheets having a thickness of 1.5 mm at 100° C. The results are set forth in Table 2 here below.

Fluid Resistance Tests

Chemical resistance of rubbers to fluids was measured according to ASTM D471-06 standard procedures at 100° C. during 168 hours. Mechanical properties of rubbers after treatment with fluids were also measured according to ASTM D471-06 standard procedures modified with DIN 53504 standard procedures. The results are set forth in Table 4 here below.

Mechanical Properties Tests

Mechanical properties of rubbers were measured according to DIN 53504 standard procedures using S2 dumb-bell test pieces and according to ASTM D2240-02b standard procedures using specimens of EPDM rubbers having a thickness of 3.11 mm and specimens of silicone and fluorosilicone rubbers having a thickness of 2.65 mm. The results are set forth in Table 3 here below.

EXAMPLE 1

Preparation of Linear Perfluoropolyether Having Formula (I-A)

Following the procedure described in WO 2008/122639 (SOLVAY SOLEXIS S.P.A.) 16 Oct. 2008, a PFPE diacyl fluoride was obtained by catalytic hydrogenation of a peroxidic perfluoropolyether deriving from photochemical oxidation of tetrafluoroethylene. The obtained mixture was distilled in order to get a fraction of PFPE diacyl fluoride with boiling points ranging between 110° C. and 150° C. The PFPE diacyl fluoride so recovered, having formula $TO(CF_2O)_n(CF_2CF_2O)_m\text{-}T'$, wherein T and T' are $-CF_3$ (2%) and $-CF_2COF$ (98%) groups and the average m/n ratio is 1.7, and having a number average molecular weight of 620, was submitted to photochemical fluorination at 0° C. according to the procedure described in EP 0193028 A (MONTEDISON S.P.A.) 3 Sep. 1986 until complete conversion of the acyl fluoride chain ends to yield the linear perfluoropolyether having formula (I-A) as described above.

EXAMPLE 2

The linear perfluoropolyether having formula (I-A) as described above was put in contact with EPDM, silicone and fluorosilicone rubbers according to test procedures as defined hereinabove. The results are set forth in Tables 2 and 4 here below.

COMPARATIVE EXAMPLE 2

The same procedures according to Example 2 of the invention were followed but using NOVEC® 7500 hydrofluoroether instead of the linear perfluoropolyether having formula (I-A) as described above. The results are set forth in Tables 2 and 4 here below.

Permeation tests (see Table 2 here below) as measured according to procedure as detailed above have shown that, upon contact of any one of EPDM, silicone and fluorosilicone rubbers with the linear perfluoropolyether fluid having formula (I-A) as described above, lower permeability values to said rubbers were successfully obtained as compared with those obtained upon contact with NOVEC® 7500 hydrofluoroether fluid.

TABLE 2

| Rubber | Fluid | Permeability [g · mm/m2 · d] |
|---|---|---|
| EPDM rubber | Example 2 | 6 |
| | C. Example 2 | 110 |
| Silicone rubber | Example 2 | 310 |
| | C. Example 2 | 4400 |
| Fluorosilicone rubber | Example 2 | 84 |
| | C. Example 2 | 1100 |

Fluid resistance tests according to procedure as detailed above have also shown that lower changes both in mass and in volume of any one of EPDM, silicone and fluorosilicone rubbers were obtained upon contact of said rubbers with the linear perfluoropolyether fluid having formula (I-A) as described above as compared with those obtained upon contact of said rubbers with NOVEC® 7500 hydrofluoroether fluid, that is to say that said rubbers were less swelled upon contact with the linear perfluoropolyether fluid having formula (I-A) as described above than upon contact with NOVEC® 7500 hydrofluoroether fluid (see Table 4 here below).

Mechanical properties of untreated EPDM, silicone and fluorosilicone rubbers as measured according to procedures as detailed above are set forth in Table 3 here below.

TABLE 3

| | EPDM rubber | Silicone rubber | Fluorosilicone rubber |
|---|---|---|---|
| Tensile strength at break [MPa] | 13.4 | 7.4 | 8.2 |
| Elongation at break [%] | 190 | 246 | 211 |
| Hardness [Shore A] | 72 | 70 | 72 |

As shown in Table 4 here below, after treatment of EPDM, silicone and fluorosilicone rubbers with the linear perfluoropolyether fluid having formula (I-A) as described above, according to procedures as detailed above, mechanical properties of said treated rubbers were still found adequate for enabling polymer sealants in secondary loop passageways to perform well in the process of the invention.

TABLE 4

| | EPDM rubber | | Silicone rubber | | Fluorosilicone rubber | |
|---|---|---|---|---|---|---|
| | Ex. 2 | C. Ex. 2 | Ex. 2 | C. Ex. 2 | Ex. 2 | C. Ex. 2 |
| Mass [Δ %] | +0.1 | +1.7 | +2.6 | +18.9 | +2.5 | +15.5 |
| Volume [Δ %] | +0.1 | +1.3 | +2.8 | +14.8 | +2.4 | +15.0 |
| Tensile strength at break [Δ %] | +10 | −3 | +4 | +8 | −13 | −27 |
| Elongation at break [Δ %] | +8 | −2 | −8 | −10 | −17 | −34 |
| Hardness [Δ Shore A] | +1 | −1 | 0 | −6 | −1 | −9 |

It has been thus found that, in the presence of heat transfer fluids comprising one or more linear perfluoropolyether fluids having formula (I) as described above, advantageously endowed with low solubility of water therein, the process of the invention is successfully carried out by advantageously improving leak tightness through polymer sealants in secondary loop passageways, due to low permeability and high chemical compatibility and resistance of said fluids towards said polymer sealants, while minimizing maintenance of the secondary loop heat transfer system and costs associated thereto.

The invention claimed is:
1. A method for transferring heat, said method comprising:
(1) transferring heat from a body to a first heat transfer system by means of a secondary loop passageway comprising a heat transfer fluid and, optionally,
(2) transferring heat from a second heat transfer system to said body by means of said secondary loop passageway comprising said heat transfer fluid, wherein:
said second heat transfer system is the same as or different from said first heat transfer system;

said secondary loop passageway comprises at least one polymer sealant selected from the group consisting of a rubber seal and a plastic pipe; and said heat transfer fluid comprises one or more linear perfluoropolyethers having formula (I-bis):

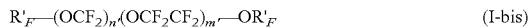
$$R'_F\text{—}(OCF_2)_{n'}(OCF_2CF_2)_{m'}\text{—}OR'_F \quad \text{(I-bis)}$$

wherein $R_F$, equal or different at each occurrence, is a $C_1$-$C_3$ perfluoroalkyl group, and m' and n' are integers greater than 0 and up to 50, m'/n' being between 0.1 and 10, and wherein said heat transfer fluid is circulated through said secondary loop passageway in step (1) for transferring said heat from said body to said first heat transfer system and, optionally, in step (2) for transferring said heat from said second heat transfer system to said body.

2. The method of claim 1, wherein the temperature of the body is set at temperatures typically of less than −15° C.

3. The method of claim 1, wherein step (2) as defined in claim 1 is present.

4. The method of claim 3, wherein the second heat transfer system is the same as the first heat transfer system.

5. The method of claim 3, wherein the second heat transfer system is different from the first heat transfer system.

6. The method of claim 1, wherein the heat transfer fluid comprises:
at least 50% by moles of one or more linear perfluoropolyethers having formula (I-bis),
optionally, one or more fluids selected from the group consisting of hydrofluoroethers (HFEs), hydrofluoropolyethers (HFPEs) and perfluoropolyethers (PFPEs), and
optionally, one or more additives.

7. The method of claim 6, wherein the heat transfer fluid comprises:
at least 50% by moles of one or more linear perfluoropolyethers having formula (I-bis), and
optionally, at most 40% by moles of one or more hydrofluoropolyether fluids (HFPEs) having formula (III):

$$R_bO\text{—}R_f\text{—}R_{b'} \quad \text{(III)},$$

wherein:
$R_b$ and $R_{b'}$, equal to or different from each other, are independently selected from the group consisting of —$C_mF_{2m+1}$ and —$C_nF_{2n+1-h}H_h$, with m, n being integers from 1 to 3, h being integer≥1 such that h≤2n+1, with the proviso that one of $R_b$ and $R_{b'}$ is a —$C_nF_{2n+1-h}H_h$ group as defined above, the remaining group being a —$C_mF_{2m+1}$ group as defined above;
$R_f$ is a perfluoropolyoxyalkylene chain having structure:
(1) —$(CF_2O)_{a1}$—$(CF_2CF_2O)_{b1}$—$(CF_2$—$(CF_2)_{z'}$—$CF_2O)_{c1}$, with a1, b1 and c1 being integers up to 100 and z' being an integer equal to 1 or 2, a1≥0, b1≥0, c1≥0 and a1+b1>0 and b1/a1 being comprised between 0.1 and 10.

8. The method of claim 6, wherein the heat transfer fluid consists of one or more linear perfluoropolyethers having formula (I).

9. The method of claim 1, wherein the secondary loop passageway comprises at least one rubber seal.

10. The method of claim 2, wherein the temperature of the body is set at temperatures typically of less than −25° C.

11. The method of claim 10, wherein the temperature of the body is set at temperatures typically of less than −50° C.

12. The method of claim 6, wherein the heat transfer fluid comprises at least 60% by moles of one or more linear perfluoropolyethers having formula (I-bis).

13. The method of claim 6, wherein the heat transfer fluid comprises at least 70% by moles of one or more linear perfluoropolyethers having formula (I-bis).

14. The method of claim 7, wherein the heat transfer fluid comprises at least 60% by moles of one or more linear perfluoropolyethers having formula (I-bis).

15. The method of claim 7, wherein the heat transfer fluid comprises at least 70% by moles of one or more linear perfluoropolyethers having formula (I-bis).

16. The method of claim 7, wherein the heat transfer fluid comprises, at most, 30% by moles of one or more hydrofluoropolyether fluids (HFPEs) having formula (III).

17. The method of claim 7, wherein the heat transfer fluid comprises, at most, 20% by moles of one or more hydrofluoropolyether fluids (HFPEs) having formula (III).

18. The method of claim 9, wherein m' and n' are integers higher than 0 and up to 20.

* * * * *